Figures 1, 2:
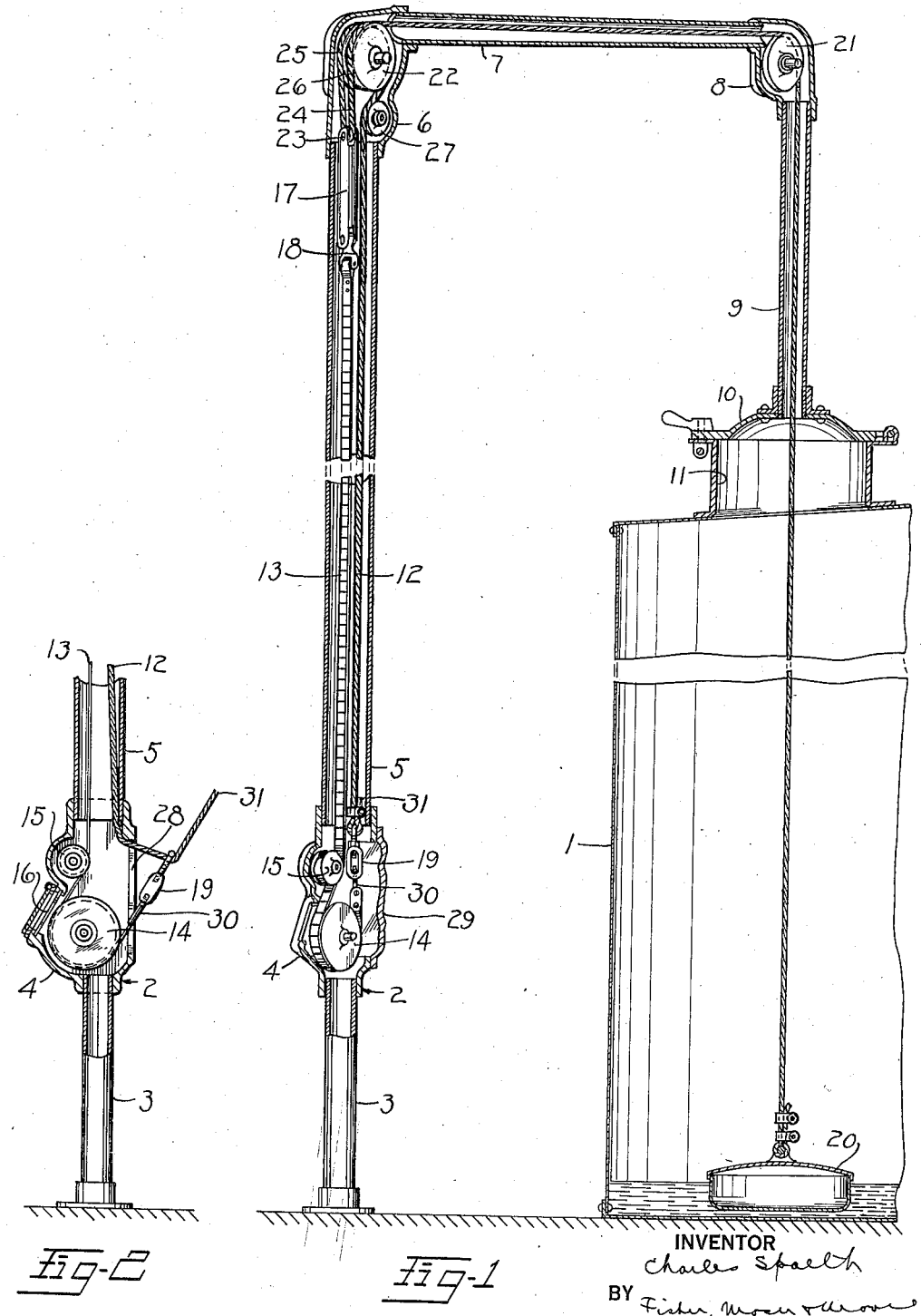

June 14, 1938.  C. SPAETH  2,120,719
FLOAT GAUGE
Filed May 28, 1937

INVENTOR
Charles Spaeth
BY Fisher, Moen & Moore
ATTORNEYS

UNITED STATES PATENT OFFICE 2,120,719

FLOAT GAUGE

Charles Spaeth, Cleveland, Ohio

Application May 28, 1937, Serial No. 145,360

7 Claims. (Cl. 73—321)

My invention relates to improvements in float gauges for automatically indicating the height of liquid in a storage tank.

Heretofore various types of float gauges have been used for the purpose above mentioned but they have proven unsatisfactory due to the time lost in effecting final adjustment of or alteration in length of the float cable during initial installation of the gauge on a liquid storage tank or when making adjustments found necessary after installation, due to stretching of the cable or other causes.

The principal object of the present invention is to provide a simply constructed and inexpensive type of tank gauge which permits of installations and adjustments being made with the expenditure of a minimum of time and effort, and therefore at small cost.

Other objects and advantages of the invention will be apparent as the specification is considered in connection with the accompanying drawing, in which:

Figure 1 is a perspective view partly in section of a gasoline storage tank equipped with the improved float gauge; and Figure 2 is a fragmentary sectional view taken through indicator housing.

Referring more particularly to the drawing, I denotes a storage tank, for gasoline or similar liquids, from which the liquid is drawn from time to time. It is desirable that conveniently installable and adjustable automatic means be provided for informing the attendant as to the amount of liquid in the tank at all times, thus eliminating the hazard and cost incident to the use of a gauge pole for determining this fact. According to the present invention this desideratum is obtained by virtue of a novel construction of tank gauge mechanism 2 mounted upon and at one side of the tank 1. Thus a pedestal 3 having its base seated upon the ground adjacent the tank 1, supports an indicator casing or housing 4, which in turn supports a vertically disposed pipe 5. Mounted upon the upper end of this pipe 5, is a sheave housing 6, communicating through a cross pipe 7 with a somewhat similar sheave housing 8, the latter being supported upon the upper end of a short vertical pipe 9, the lower end of which seats on the tank cover 10 and communicates through an opening 11 in the cover with the interior of the tank.

The piping just described constitutes a housing for a steel cable 12 and a graduated indicator tape 13, the latter traveling over a sheave 14 mounted in the indicator housing 4. The tape, preferably of stainless steel, also passes over an idler guide roller or sheave 15 and beneath a sight glass 16, both of which are suitably mounted in the indicator housing. One end of the tape 13, is pivotally connected to the lower end of a counterweight 17, through the medium of a latch member 18, and the other end is secured to one end of the cable 12 by means of a turnbuckle 19, the other end of the cable being permanently fastened to a float 20, in tank 1.

As previously stated the cable proper is permanently fastened at one end to the float 20, from where it leads up through pipe 9, over a sheave 21 in housing 8 and through the horizontally disposed pipe 7 and thence downwardly in groove 25 of a double sheave 22, in housing 6, to the upper bifurcated end of counterweight 17. At this point the cable passes slidably over a pin or roller 23 and is doubled back upon itself or looped to produce the flight 24, which flight extends upwardly over the double sheave 22, in a second groove 26 thereof, and thence downwardly over a guide pulley 27 to the upper end of turnbuckle 19, to which the cable end 31 is connected, thus completing the circuit. It will be noted that since the cable above the counterweight constitutes a double line or loop, any slack is automatically taken up, the weight of the float 20 being sufficient to compensate for the weight of the cable, tape and counterweight.

In making installations the length of cable and tape required is based upon the height of the storage tank plus length taken up by fittings. For example, assuming the tank 1 to be forty (40) feet in height, the length of cable required is twice the height of the tank or eighty (80) feet, plus the distance from top of tank, over sheaves 21 and 22 to top of turnbuckle 19. This can be fairly accurately determined by an obvious process of calculation which would take into consideration the fact that the length of the counterweight is in effect a part of the cable. However, to facilitate installation and final adjustment the cable is cut, about two (2) feet longer than required. The length of tape required is equal to the height of the tank or travel of float 20, that is forty (40) feet. As in the case of the cable, allowance is also made for clearance of the tape at sheaves which would bring the required length of tape up to say forty one (41) feet.

Installation is effected by connecting the cable to the float and after passing the cable over the sheave 22 the balance of cable, the counterweight 17, turnbuckle 19 and tape 13 are dropped down through pipe 5. After the tape has been passed around sheave 14 the end 30 of the tape is secured to the turnbuckle at the door opening 28. In order to do this the workman pulls the turnbuckle 19 and the end 30 of the tape out through or opposite the door opening 28 and connects this end of the tape to the turnbuckle. After installation has been made and the workman has determined the number of feet of gas in the tank 1, by means of a gauge pole, and before opening 28 in the indicator housing 4 has been closed by door 29, a reading is taken. The cable is then pulled out through door opening 28 and shortened at the turnbuckle by disconnecting the cable end 31 from the turnbuckle and cutting off the required length of cable before again securing the end 31 to the turnbuckle. After the cable has been shortened and released it will automatically adjust itself to correspond with the position of float 20 and to indicate accurately at the sight glass 16, the amount of liquid in the tank.

Regardless of the position of the tape with reference to the sight glass, the former, assuming that the cable is of the exact required length, will automatically adjust itself to indicate at the sight glass exactly the position of the float when the adjacent ends 30 and 31 of the tape and cable are restored to normal position within the housing 4. However it is not possible to initially cut the cable to the exact required length because of the difficulty involved in making absolutely accurate calculations and for the further reason that extra length of cable is necessary to enable initial installation to be made with facility. Therefore it becomes necessary for the workman to take a reading before making final adjustment and he will, upon finding that the reading does not check with the known quantity of gas in the tank, or the known position of the float 20, shorten the cable in the manner just described, it being possible for all adjustments to be conveniently made at the door opening in the indicator housing by virtue of the fact that the tape and cable ends 30 and 31 can be pulled out of the housing without permanently disturbing the correct indicating position of the tape with respect to the sight glass. For minute or finer adjustments manipulation of the turnbuckle will suffice without the necessity of shortening the cable. In fact the effect of the stretching of the cable, after the original installation and check up has been made, can be corrected in this manner. In prior constructions with which I am familar adjustments have been made at the float which involved removal of the latter from the tank as well as other difficulties. With the present construction the tape and cable ends can be pulled through the door opening 28 or into convenient position opposite the door opening without permanently altering the relative position of the tape and sight glass, because when released, the tape will be automatically pulled to its normal position.

It will be understood that the sliding looped connection between the cable and the pin 23 on counterweight 17 permits of final adjustments being conveniently made because the slack occasioned by pulling the cable and tape out through the opening 28 will be automatically taken up. Perhaps this can be best illustrated by pointing out that after final adjustments have been made there will be a compensating movement of the looped portion of the cable over roller 23 until all slack has been taken up but when this has occurred there will be no shifting movement at this point. In fact but for the necessity of making adjustments and the desirability of having any slack thus created automatically taken up, the cable could be severed at its point of movable attachment to the weight 17, and the two ends of the cable permanently secured to the latter without affecting the operation of the device.

What I claim is:

1. In combination with a liquid storage tank having a float therein, an indicator casing adjacent the lower end of the tank, a tape movable through said casing and connected to a weight at one end, a guide supported above the top of the tank, a double cable slidably connected to said weight and passing over said guide, the free ends of the cable being connected respectively to the other end of the tape and to the said float.

2. In combination with a liquid storage tank having a float therein, a sheave housing and an indicator casing disposed at one side of the tank, said indicator casing provided with a sight glass, a sheave in said indicator casing and a double sheave in said housing, an indicating tape of a length substantially equal to the height of the tank looped around the sheave in the indicator casing and visual through said glass, a counterweight connected to one end of said tape and a turnbuckle connected to the other end thereof, a cable slidably connected to said weight and passing over said double sheave, the ends of said cable being connected respectively to said float and turnbuckle.

3. In combination with a liquid storage tank having a float therein, an indicator casing having a sight glass, a sheave in said casing, an indicating tape passing around said sheave and visual through said glass, a counterweight secured at its lower end to one end of the tape, a double sheave adjacent the upper end of the tank, a double cable passing over said double sheave and looped to the upper end of said counterweight, the ends of the cable being connected respectively to the other end of the tape and to the float.

4. In combination with a liquid storage tank having a float therein, an indicator casing adjacent the lower end of said tank and having a work opening and a sight glass opening, a sheave in said casing, an indicating tape of a length substantially equal to the height of the tank passing around said sheave and visual through said sight glass opening, a weight secured to one end of the tape, a double cable having a looped portion loosely passing transversely through said weight, the ends of said cable being connected to the other end of said tape and to the float respectively.

5. In combination with a liquid storage tank having a float therein, an indicator casing, an indicator tape passing through said casing, a cable having one end secured to said float and the other end secured to one end of said tape, said indicator casing having an opening through which the tape may be withdrawn for convenience in making adjustment in cable length, and weighted means slidably associated with said cable and connected to the other end of said tape for keeping the tape and cable taut when proper adjustment of cable length has been made.

6. In combination with a liquid storage tank having a float therein, an indicator casing, an indicator tape passing through said casing, a top sheave, a counterweight connected at one end to one end of said tape, a cable connected to the float at one end and passing over said top sheave and slidably connected to the other end of said weight and fixed to the other end of the tape whereby said weight is adapted to automatically take up slack in the cable and tape.

7. In combination with a liquid storage tank having a float therein, an indicator casing adjacent said tank, a weighted tape movable through said casing, a guide supported above the tank, a cable in said guide and casing and having one end connected to the float and having a looped portion loosely passing through one end of the tape and the other end connected to the opposite end of the tape whereby the tape is kept tight.

CHARLES SPAETH.